United States Patent [19]
Lee et al.

[11] Patent Number: 5,790,217
[45] Date of Patent: Aug. 4, 1998

[54] POLYMER-DISPERSED FERROELECTRIC LIQUID CRYSTAL DISPLAY

[75] Inventors: Sin Doo Lee, Seoul; Seong Woo Suh, Koyang; Kye Hun Lee, Seoul, all of Rep. of Korea

[73] Assignee: Orion Electric Co., Ltd., Gumi, Rep. of Korea

[21] Appl. No.: 619,635

[22] PCT Filed: Aug. 5, 1994

[86] PCT No.: PCT/KR94/00106

§ 371 Date: Jun. 24, 1996

§ 102(e) Date: Jun. 24, 1996

[87] PCT Pub. No.: WO96/04586

PCT Pub. Date: Feb. 15, 1996

[51] Int. Cl.[6] .................................................. G02F 1/1333
[52] U.S. Cl. ............................. 349/86; 349/92; 349/93
[58] Field of Search ............................... 349/86, 93, 92

[56] References Cited

U.S. PATENT DOCUMENTS

| | | | |
|---|---|---|---|
| 5,437,811 | 8/1995 | Doane et al. | 349/86 |
| 5,455,083 | 10/1995 | Noh et al. | 349/89 |
| 5,530,566 | 6/1996 | Kumar | 349/86 |
| 5,541,747 | 7/1996 | Nishi et al. | 349/49 |

OTHER PUBLICATIONS

Lee et al., "Fast Linear Electro–Optical Switching Properties of Polymer–Dispersed Ferroelectric Liquid Crystals", Applied Physics Letters, vol. 64, No. 6, Feb. 7, 1994, pp. 718–720.

*Primary Examiner*—Anita Pellman Gross
*Attorney, Agent, or Firm*—Jacobson, Price, Holman & Stern, PLLC

[57] ABSTRACT

The present invention discloses a novel Polymer-Dispersed Ferroelectric Liquid Crystal Display (PDF LCD). The active matrix LCD such as a TFT LCD, the solution of low response speed of nematic LCD, requires very high production costs. The FLCD utilizing ferroelectric liquid crystal exhibits highly rapid response speed, but results in an unstable structure, difficult fabrication, and incompetency of expressing gray scales. Meanwhile, the PD LCD exhibits a simple structure, wide viewing angle and high strength, but low contrast thereof disqualifies it for image displays. The present invention combines the PD LCD and FLCD, that is, droplets of ferroelectric liquid crystal are dispersed in a polymer matrix to include the merits and compensate for the shortcomings of each. As a result, there is provided a novel PDF LCD having very rapid response speed, resistance to external shock or heat, and high contrast. Moreover, the present PDF LCD does not exhibit bistable characteristics to be able to express gray scales, and thus it is suitable for fabricating large area color image displays.

17 Claims, 2 Drawing Sheets

POLYMER-DISPERSED FERROELECTRIC LIQUID CRYSTAL DISPLAY

TECHNICAL FIELD

The present invention relates to a liquid crystal display (LCD), and particularly to a novel LCD fabricated by dispersing ferroelectric liquid crystal(FLC) in a polymer matrix.

BACKGROUND ART

A Braun tube is generally adopted as the display for an image displaying apparatus such as a television. The Braun tube, however, has excessively large dimensions, and exhibits very high power consumption. Thus, the flat panel display(FDP) recently comes into wide use especially for the field of portable displays. Among these FDPs, the LCD is most widely used. The LCD is a typical non-emissive display utilizing electro-optic characteristics of a liquid crystal(LC), for example the dielectric anistropy.

Liquid crystals are divided into smectic, nematic and cholesteric phases according to their molecular structures. Among them, smectic and nematic LCs can be used for the purpose of display, but the smectic LC is not easily be aligned and the alignment is not stable under heat or shock. Most of practical LCDs, therefore, adopt nematic LCs.

As the nematic LCD, TN(Twisted Nematic) or STN (Super Twisted Nematic) LCDs have been used. TN or STN LCDs are constructed by aligning LC molecules to relatively twisted directions at upper and lower surfaces of the LC layer, and are already widely used. But, they cannot fulfill the rapid response speed and the viewability, such as a wide viewing angle, necessary for achieving the high resolution and a large screen. Accordingly, full-color or dynamic images cannot easily be achieved by these nematic LCDs. Moreover, they cannot be easily driven, as the optical response of simple matrix type nematic LCDs, depends upon the square of the applied voltage to result in little level difference between selected and non-selected pixels. As a result, the nematic LCD can only be applied to a portable television or a monitor of a notebook computer with unsatisfactory image quality. A TFT(Thin Film Transistor) LCD of an active matrix type has been developed, which enables a high speed action by independently switching each pixel by an array of driving elements. However, it has a highly complicated structure which results in high production cost and difficulty in fabricating a large screen.

All of the above described LCDs require the alignment of LC molecules in prescribed directions at boundary surfaces of the LC, and use separate polalizers to narrow the viewing angle and deteriorate the brightness. Thus, a Polymer-Dispersed (PD) LCD has been developed. It adopts the structure of dispersing submicron-sized nematic LC droplets in a polymer matrix. As the nematic LC has positive dielectric anistropy responding to the external electric field, it maintains an opaque state by scattering incident light when the electric field is not applied. When the electric field is applied, LC molecules of LC droplets are aligned in one direction to be a transparent state, and allow light to pass. As the PD LCD does not adopt an polarizer it results in a simple structure, a high brightness, and an wide viewing angle. Moreover, its polymer structure enables a flexible large LCD of a high strength at a low production cost. In the PD LCD, however, the driving voltage is applied to a LC through the polymer matrix, thereby revealing a high operating voltage, a large power consumption, and a low contrast. As a result, it can be utilized to control the lighting of a window, and not suitable for the image display such as a television.

All of above described LCDs utilize the dielectric anistropy of a LC, and the electro-optic characteristics thereof depend upon only the strength of applied voltage, regardless of its polarity. On the contrary, ferroelectric material is spontaneously polarized even if the electric field is not applied to exhibit a so-called bistable structure with two stable states. Recently, there has been reported that a smectic LC of a chiral-C phase exhibits ferroelectricty with a very high spontaneous polarization, and it has been adopted to a Ferroelectric LCD(FLCD).

In the FLCD, the direction of LC molecules is changed between two states without any alteration of the molecular structure, thus revealing a highly rapid response speed regardless of the viscosity of the LC. While the nematic LCD has the response speed of tens or hundreds of milliseconds (ms), the FLCD reveals much faster response speed of tens of microseconds ($\mu s$). Therefore, the FLCD overcomes the limit of the information content of the STN LCD, and reduces the production cost and, initial investment as compared with the TFT LCD.

But, the chiral-C phased smectic LC is not easily be aligned, and the alignment structure is easily changed by external shock or heat, thus resulting in low reliability.

Moreover, the thickness of the LC layer, namely the gap between two substrates should be reduced to prevent the spiral movement of the LC due to the chiral characteristic, and to align the LC in prescribed directions. Thus, the conventional FLCD forms the gap between substrates at 1 to 2 $\mu m$, and is referred to as Surface Stabilized (SS) FLCD. But it is very difficult to uniformly keep this small gap uniformly over the large area, thus the fabrication of a large FLCD, especially a SS FLCD, is practically impossible.

While the other voltage dependent LCDs can express gray scales by controlling the strength of the electric field, the FLCD is impossible to represent intrinsic gray scales, as the FLCD has only two states of aligned directions of LC molecules according to the polarity of the external electric field.

DISCLOSURE OF THE INVENTION

In consideration of the drawbacks of the above described various conventional LCDs, an object of the present invention is to provide a novel Polymer-Dispersed Ferroelectric Liquid Crystal Display(PDF LCD) having the advantage and compensating for the disadvantage of the PD LCD and the FLCD.

To achieve the above object, the PDF LCD according to the present invention, having two substrates opposed with a prescribed gap there between two grids respectively arranged on the substrates and being opposed to each other, and an LC layer in a cavity between the two substrates, characterized in that:

the LC layer is constructed by dispersing ferroelectric LC droplets in a polymer matrix.

According to one aspect of the present invention, the ferroelectric LC is smectic LC of chiral-C phase.

According to another aspect of the present invention, the LC located between the substrates is aligned in prescribed directions at each of its boundary surfaces, and is preferably aligned by rubbing an alignment layer.

According to other aspect of the present invention, means for polarizing, such as polarizers, are provided on substrates.

The resultant PDF LCD according to the present invention reveals a wide viewing angle and a high strength of a PD LCD, and the rapid response speed of an FLCD. The PDF LCD overcomes the drawback of the PD LCD thereby providing a high contrast image, and resolve the alignment and gray scale problems of the FLCD, thereby providing a reliable alignment structure of stable characteristics, and make it possible to express intrinsic gray scales. The cell gap of the PD FLCD should not be formed as a small gap, as the SS FLCD, thus the fabrication of the PD FLCD becomes easy and thus a large LCD can easily be constructed. dr cl

BRIEF DESCRIPTION OF DRAWINGS

These and other objects and advantages of the present invention will be more apparent form the following detailed description, with reference to the accompanying drawings, in which:

Referring to FIG. 1, a PDF LCD according to the present invention comprises an LC layer L formed by dispersing LC droplets D in a polymer matrix M, in a cavity, or cell gap, between front and rear substrates F, R. This structure is basically similar to that of PD LCD. The LC to form the LC droplets, however, is ferroelectric LC exhibiting the spontaneous polarization, in the present invention. The ferroelectric LC is smectic LC of chiral-C phase, for example. The present LCD requires an alignment structure to utilize electro-optic characteristics of ferroelectric LC, compared with the PD LCD using the scattering mode.

Figure 1:
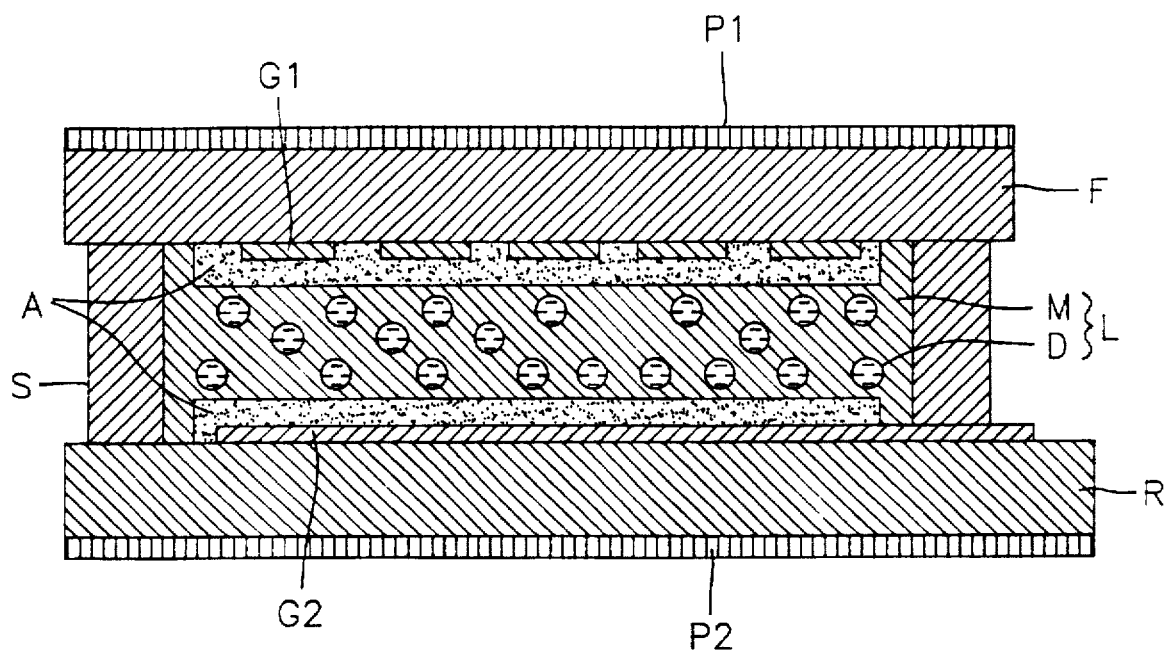
FIG. 1 is a schematic sectional view depicting the PDF LCD according to the present invention.

On inner surfaces of two substrates F, R, grids G1, G2 are arranged in the form of a matrix, for applying voltage to select pixels, and they are preferably formed of transparent conductive material, such as ITO(Indium Tin Oxide).

Meanwhile, alignment layers A are respectively formed on grids G1, G2 to align LC molecules in the droplet D is prescribed directions. The layer A is used not only for aligning LC, but also for preventing direct inflow of current from grids G1, G2 to the LC molecules. The layer A can be formed of polyimide, which is generally used for aligning TN or STN LCDs, and other polymer or aligning means other than the alignment layer A can be adopted if necessary. The polyimide layer can stably align LC molecules in LC droplets D to a prescribed direction, after being rubbed in certain directions.

At outer surfaces of each of substrates F, R, polarizers P1, P2 are respectively attached for linearly polarizing the incident light in one direction, thereby allowing or blocking light. Thus, the optical black and white states are formed to express the information.

And remaining symbol S designates, the sealing wall. Though it is not depicted plainly, spacers of glass or synthetic resin are uniformly dispersed in the cell gap between two substrates F, R to maintain an even gap between the two substrates F, R Now, procedures to fabricate a sample of the above described PDF LCD according to the present invention, will be described.

First, a test panel having a cell gap for filling with LC layer L, is prepared. The test panel is fabricated by coupling two substrates F, R with the sealing wall S, and each of substrates F, R, respectively, has grids G1, G2 and alignment layers A aligned in prescribed directions. In this example, the thickness of the cell gap, namely the thickness of the LC layer L is selected to be 9.6 μm.

Then, LC and polymer to form the LC layer L is mixed in a prescribed mixing ratio. If the amount of LC is excessive, LC droplets D and polymer matrix M cannot be completely separated in the phase separation, while the electro-optic characteristics are deteriorated in the defficient case. Accordingly, the selection of an appropriate mixing ratio is very important. In the example, CS 2004 (trade name) of Chisso is adopted as chiral-C phase smectic LC, and NOA61 UV(Ultra Violet) curable polymer is adopted as polymer. According to the present inventor's tests, the range of 1:1.5 to 1:10 in weight seems to be appropriate for the mixing ratio of LC to polymer, and LC and polymer are mixed in the weight ratio of 1:3 in the example.

After that, the mixture of LC droplets and polymer is injected in the cell gap of the test panel. The temperature at the point of the injection, is preferred to be relatively high for preventing the separation of the mixture and resultant stain, due to the viscosity difference between LC droplets and polymer. The temperature at the point of the injection is preferred to be around the phase transition temperature at which LC molecules are changed from the LC phase to the isotropic liquid phase, and the temperature is selected to be 120° C. in the example.

If UV light is applied immediately after the injection of the mixture, the mixture is cured before the flow is stabilized. Thus, the mixture is kept still for a prescribed time at the above described temperature. In the example, the mixture is kept under the phase transition temperature of the LC molecules for example 120° C., for ten minutes. According to the present inventor's tests, LC droplets and polymer will not be uniformly mixed but separated, if the keeping temperature is low, while the effect of the alignment is reduced if high. Thus, the selected keeping temperature corresponds to the lowest temperature which allows the two materials to uniformly mixed.

Then, LC droplets and polymer phase separated by radiating with Uv light. In the phase separation, higher ambient temperature or higher radiation intensity of UV light accelerates the curing speed to reduce the size of the LC droplet D. Therefore, the size of the LC droplet D can be adjusted by controlling ambient conditions as described above. According to the present inventors tests, appropriate optical characteristics are obtained when the diameter of the LC droplet D is in the range of 0.5 μm to 10 μm. In that case, the gap between two substrates F, R, namely the thickness of the LC layer L or the cell gap, is preferred to be the value at which LC droplets D are adequately dispersed in the cured polymer matrix M, for example, in the range of 2 μm to 10 μm.

Meanwhile, two polarizers P1, P2 are respectively attached to each outer surface of substrates F, R, and attached angles thereof will be determined by the angle at which an optimum contast can be obtained according as the tilt angle of the LC. In the example, one polarizer, P1, is attached at the angle of 22.5°, and the other polarizer, P2, perpendicular with respect thereto.

Electro-optic characteristics of the example of the PDF LCD fabricated as described above, will now be described with reference to FIG. 2 to FIG. 4.

Figure 2:
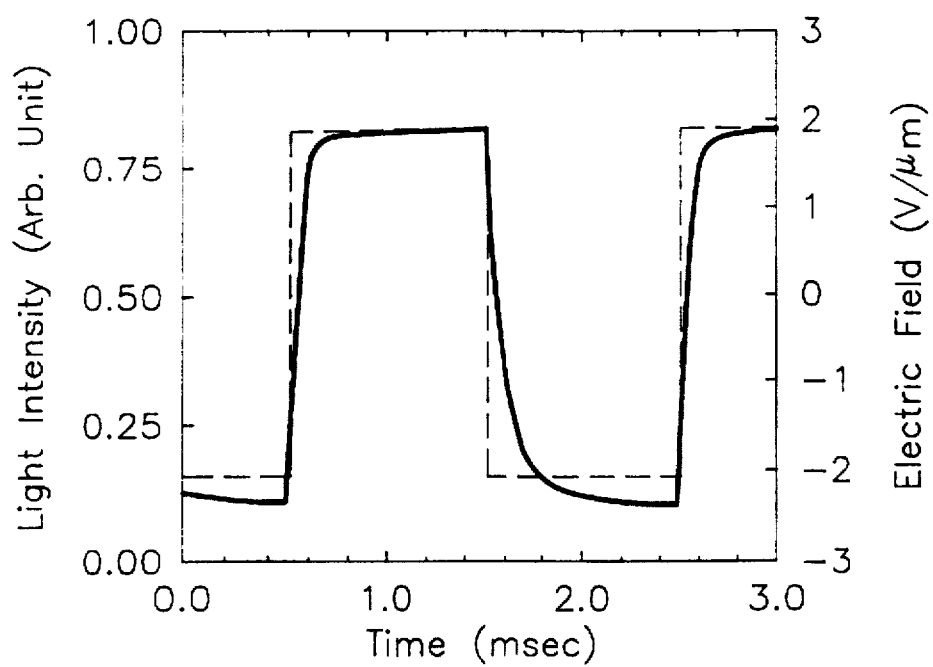
FIG. 2 is a graph showing the response of the PDF LCD to a square wave.

Referring to FIG. 2, there is shown the electro-optic response of the present LCD, when the pulse of a square wave formed voltage of 500 Hz is applied to the example. As shown in the drawing, the PDF LCD according to the present invention responds very well to a change of the external electric filled. Thus, the PDF LCD can be used for electro-optic display elements.

Figure 3:
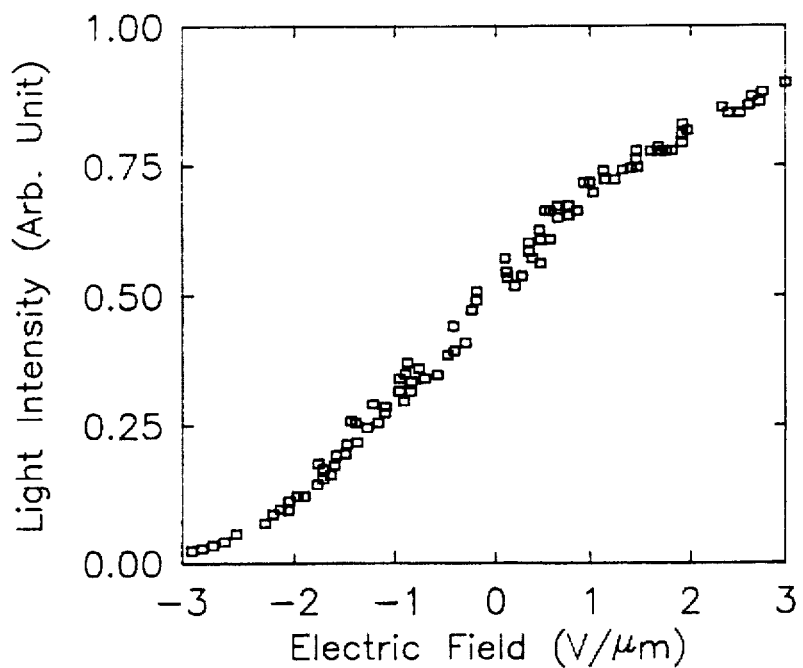
FIG. 3 is a graph illustrating the change of electro-optic characteristics of the PDF LCD with a change of applied voltage.

FIG. 3 illustrates the intensity of light after passing through two polarizers P1, P2 when the voltage of the squre wave is varied. As shown in the drawing, the PDF LCD according to the present invention responds linearly at the low voltage, and is smoothly saturated as the voltage increases. In other words, the PDF LCD according to the present invention does not reveal the bistable characteristics of the SS FLCD, but exhibits continuous light passing characteristics according to the change of the external applied voltage. Therefore, the expression of intrinsic gray scales can be achieved by changing the applied voltage.

Figure 4:
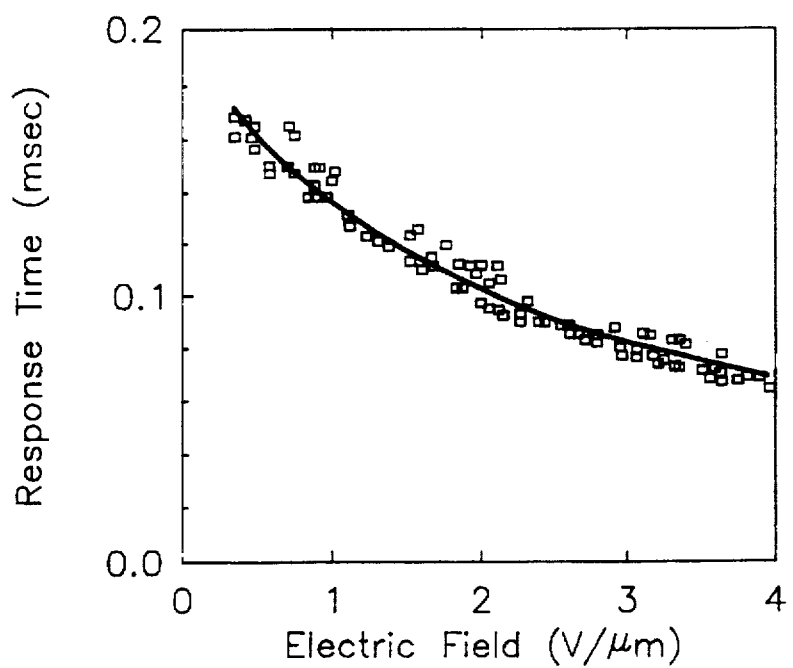
FIG. 4 is a graph showing the response speed of the PDF LCD according to the present invention.

Referring to FIG. 4, there is shown the response speed of the present LCD according as the change of the external electric field. As shown in the drawing, the PDF LCD according to the present invention exhibits a response speed of about 0.1 ms, i.e. 100 µs. The PDF LCD is relatively slower than the FLCD which exhibits the response speed of tens of µs, but is much faster than the nematic LCD revealing tens of ms.

As described above, the present invention combines the PD LCD and FLCD to compensate merits and shortcomings of each of them. But the present PDF LCD reveals novel electro-optic characteristics which cannot be anticipated from a simple combination of the PD LCD and the FLCD.

Thus, the PDF LCD according to the present invention, exhibits a rapid response and high contrast as in the conventional FLCD, and remedies drawbacks of the FLCD to get a stable alignment and to express gray scales. And the thickness of the cell gap may not be formed in small as the SS FLCD, thus a large LCD can be easily fabricated.

Moreover, the PDF LCD according to the present invention has an excellent strength as in the PD LCD, thus a strong LCD resistant to external shock or impact can be fabricated. And its wide viewing angle also exhibits an excellent viewability.

Especially, the present PDF LCD exhibits the rapid response speed without any active matrix drive as in the TFT LCD, thus excludes the necessity of any active elements to drastically reduce production costs.

INDUSTRIAL APPLICABILITY

These various characteristics of the present PDF LCD will be suitable for displaying color images on a large screen, thus the present invention facilitates the fabrication of large area color display, such as a high definition television.

We claim:

1. A polymer dispersed ferroelectric liquid crystal display (PDF LCD) comprising a first and a second substrate arranged opposite each other with a prescribed gap therebetween, a first and a second grid arranged on said substrates opposed to each other, respectively, a first and a second alignment layer formed on said grids, respectively, and a liquid crystal layer in a cavity between said two substrates, wherein said liquid crystal layer comprises droplets of ferroelectric liquid crystal dispersed in a polymer matrix, and a mixing ratio of said ferroelectric liquid crystal and said polymer is in a range of 1:1.15 to 1:10 in weight.

2. A PDF LCD according to claim 1, wherein said ferroelectric liquid crystal is a smectic liquid crystal of a chiral-C phase.

3. A PDF LCD according to claim 1, wherein said liquid crystal is aligned in prescribed directions, respectively, at two boundary surfaces of said liquid crystal layer.

4. A PDF LCD according to claim 1, wherein, each of alignment layers is formed by coating polymer material on said grids and rubbing said polymer coating.

5. A PDF LCD according to claim 4, wherein said polymer material to be rubbed is polyimide.

6. A PDF LCD according to claim 1, further comprising means for polarizing on said substrates.

7. A PDF LCD according to claim 6, wherein said means for polarizing are polarizers which linearly polarize incident light.

8. A PDF LCD according to claim 1, wherein the diameter of said droplets in said polymer matrix is in the range of 0.5 µm to 10 µm.

9. A PDF LCD according to claim 1, wherein the thickness of said liquid crystal layer is in the range of 2 µm to 10 µm.

10. A method for manufacturing a polymer dispersed ferroelectric liquid crystal display, comprising the steps of:

forming a first substrate having a first grid on a surface thereof and providing a first alignment layer overlying the first grid;

forming a second substrate having a second grid on a surface thereof and providing a second alignment layer overlying the second grid;

coupling the first and second substrates with sealing walls such that the substrates are opposite to each other with a prescribed gap therebetween;

injecting a mixture of ferroelectric liquid crystal and polymer into the prescribed gap; and phase separating the liquid crystal and polymer, wherein a mixing ratio of said ferroelectric liquid crystal and said polymer is in a range of 1:1.15 to 1:10 in weight.

11. The method according to claim 10, wherein a temperature at the state of injecting said mixture, is about the phase transition temperature of said liquid crystal.

12. The method of according to claim 10, and wherein said phase separation is performed by radiation of UV.

13. The method according to claim 10, wherein said ferroelectric liquid crystal is a smectic liquid crystal of a chiral-C phase.

14. The method according to claim 10, wherein the step of forming each of said first and second alignment layers comprises:

coating polymer material on the grids; and rubbing the coated polymer material.

15. The method according to claim 14, wherein the polymer material is polyimide.

16. The method according to claim 10, wherein said mixture is kept for a prescribed time at a prescribed temperature after the injecting step.

17. The method according to claim 10, further comprising a step of attaching two polarizers to outer surfaces of the two substrates.

* * * * *